(12) United States Patent
Paul et al.

(10) Patent No.: US 12,388,668 B2
(45) Date of Patent: Aug. 12, 2025

(54) ISOLATED TRANSCEIVER FOR POWER OVER ETHERNET

(71) Applicant: Analog Devices, Inc., Wilmington, MA (US)

(72) Inventors: Michael T. Paul, Goleta, CA (US); Heath Dixon Stewart, Santa Barbara, CA (US); Andrew J. Gardner, Santa Barbara, CA (US)

(73) Assignee: Analog Devices, Inc., Wilmington, MA (US)

( * ) Notice: Subject to any disclaimer, the term of this patent is extended or adjusted under 35 U.S.C. 154(b) by 719 days.

(21) Appl. No.: 17/708,777

(22) Filed: Mar. 30, 2022

(65) Prior Publication Data

US 2022/0321366 A1 Oct. 6, 2022

Related U.S. Application Data

(60) Provisional application No. 63/169,338, filed on Apr. 1, 2021.

(51) Int. Cl.
*H04L 12/10* (2006.01)

(52) U.S. Cl.
CPC .................. *H04L 12/10* (2013.01)

(58) Field of Classification Search
CPC .......................... H04L 12/10; H04L 12/40045
See application file for complete search history.

(56) References Cited

U.S. PATENT DOCUMENTS

| | | | |
|---|---|---|---|
| 10,587,424 B1 * | 3/2020 | Bhagwat | H04L 12/10 |
| 11,240,070 B1 * | 2/2022 | Lin | H03K 5/2481 |
| 2006/0218422 A1 * | 9/2006 | Camagna | H04L 12/40136 |
| | | | 713/300 |

* cited by examiner

*Primary Examiner* — Jaweed A Abbaszadeh
*Assistant Examiner* — Brynne J. Corcoran
(74) *Attorney, Agent, or Firm* — Schwegman Lundberg & Woessner, P.A.

(57) ABSTRACT

A network node device for coupling to a network via a shared link that carries power and data. The network node device includes: one or more data transceivers to transmit and receive data over the shared link; physical layer circuitry (PHY) to transmit and receive data with the one or more data transceivers; and a galvanic isolation barrier coupled between the PHY and the one or more data transceivers, wherein the PHY transmits and receives the data with the one or more data transceivers over the galvanic isolation barrier.

21 Claims, 6 Drawing Sheets

ISOLATED TRANSCEIVER FOR POWER OVER ETHERNET

CLAIM OF PRIORITY

This application claims priority to U.S. Provisional Application Ser. No. 63/169,338, filed Apr. 1, 2021, which is incorporated by reference herein in its entirety.

FIELD OF THE INVENTION

This invention relates to wired multi-drop and power networks, where power from Power Sourcing Equipment (PSE) is transmitted to a Powered Devices (PDs) over wires that are also used for conducting differential data signals, such as Ethernet signals.

BACKGROUND

An area network (e.g., a local area network or LAN) can be comprised of multiple network nodes. Information can be communicated among the nodes of the network according to a protocol (e.g., an Ethernet protocol). In a multi-point network or multi-drop network, the multiple network nodes are connected on a shared link.

Some electronic systems transmit power over data lines to power remote equipment. Limited power can be transmitted to Ethernet-connected equipment from Power Sourcing Equipment (e.g., an Ethernet switch). DC power from the switch is transmitted over the shared link (e.g., two or more twisted wire pairs) in the standard CAT-5 cabling. One or more of the wire pairs may also transmit differential data signals because the DC common mode voltage does not affect the data. In this way, the need for providing any external power source for the Powered Devices (PDs) can be eliminated.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The nodes or PDs of a multi-drop system can be connected to a single shared link (e.g., a single twisted pair of wires). The shared link is sometimes called a mixing segment. It is desired to connect several PDs (e.g., 16 or more PDs) to the mixing segment.

Figure 1:
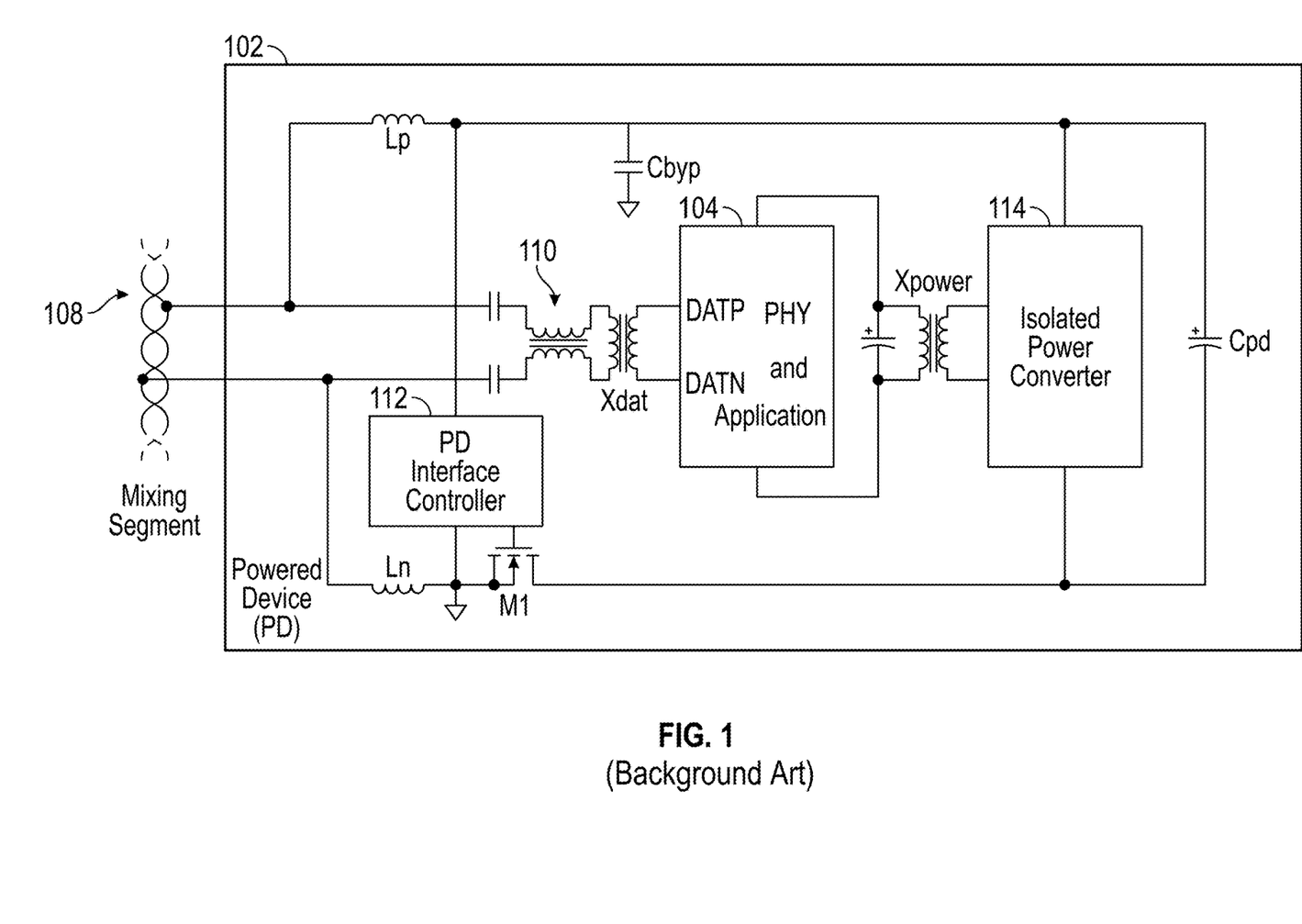
FIG. 1 is a diagram of an example of a Powered Device.

FIG. 1 is a diagram of an implementation of a PD 102. In this embodiment, the physical layer (PHY) and application circuit 104 are galvanically isolated from the mixing segment 108 by a transformer (Xdat). Data plus power systems may use a set of integrated circuits (ICs) to process the power, while a separate set of IC processes the data. In FIG. 1, the PD Interface Controller 112 is responsible for making the PD 102 recognizable to the PSE (Power Sourcing Equipment) and turning the Power on to the PD application circuit in a controlled manner using the MOSFET M1. The isolated power converter 114 converts the voltage from the mixing segment 108, typically 50V, to a voltage (e.g., 3.3 Volts) that is usable by the PHY and application circuit 104. The data path and power path are separated from each other through the diplexer formed by inductors Lp, Ln, and transformer Xdat. Inductors Lp and Ln allow low frequency power to pass while blocking the high frequency data. Transformer Xdat allows high frequency data to pass, while blocking the low frequency power. A common mode choke (CMC 110) receives higher frequency differential data from the shared link and may reduce susceptibility to external electromagnetic interference (EMI). The PHY is responsible for processing the data.

Using this PD architecture, a limitation to the number of devices that can be connected to the mixing segment 108 is the lumped inductance. The lumped inductance for the system is the parallel combination of the inductance between the two wires of the mixing segment from each node attached to the mixing segment. The lumped inductance should be greater than some threshold, or the data integrity will be affected. The inductance in the node (PD), as seen from the mixing segment, is $(Lp+Ln)\|Lxdat=Lpd$.

Presently, the minimum lumped inductance for all nodes on a mixing segment compliant with IEEE 802.3 is 80 micro-Henrys (80 uH). Ignoring the effect of the power coupling inductors, Lp and Ln, and using 350 uH transformers in the data path, as is common with 10/100/1000 BASE-T ethernet, the maximum number of devices on the mixing segment can be calculated as 350 uH/80 uH=4.4.

Therefore only 4 devices can be connected to a compliant mixing segment. Increasing the data transformer Xdat inductance is a problem. 80 uH*16 Devices=1280 mH. A 1280 mH transformer will have issues with size, parasitic capacitance, and cost.

Figure 2:
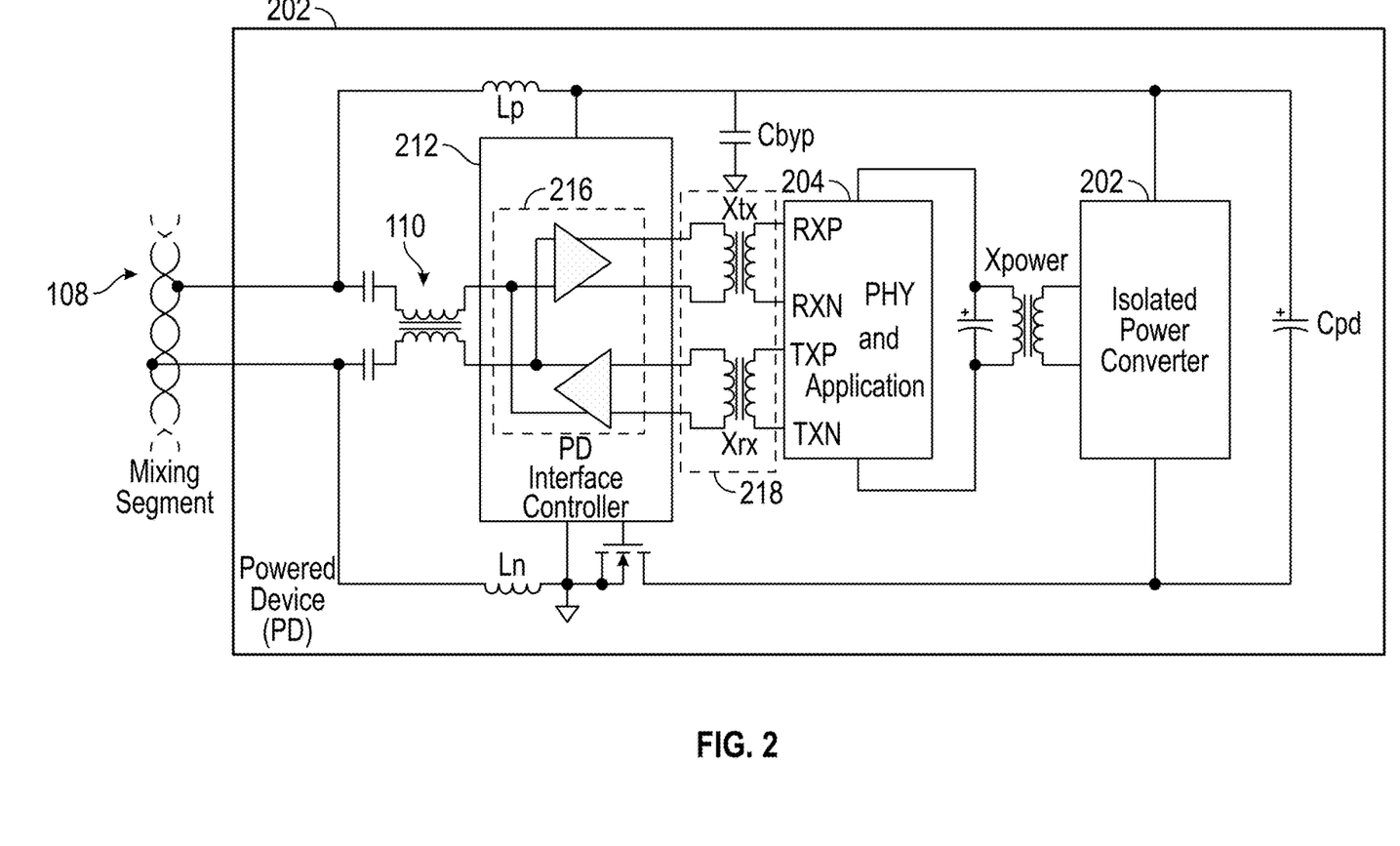
FIG. 2 is a diagram of another example of a Powered Device with a data transceiver separate from the physical layer (PHY).

A solution to this problem is to separate the data transceiver from the PHY logic and include the transceiver in the PD interface controller. FIG. 2 is a diagram of an example of a PD 202 using this approach. The data transceiver 216 communicates with the PHY over an isolated interface 218 (e.g., transformers Xtx, Xrx). The placement of the isolated interface 218 hides the data transformer inductance (Xdat in FIG. 1) from the mixing segment 108 and allows many more PDs to be connected to the mixing segment 108, the number of PDs is now limited only by the power coupling inductance LP+LN for each node or PD.

This improved architecture also allows the circuity that touches the mixing segment 108 to be built in an IC having a larger geometry, high-voltage process while the PHY can be built in an IC having a smaller geometry, low-voltage process. Therefore, it is easier to protect the PHY from extreme events like hot plug, cable discharge, telecom surge, and the like.

The isolation barrier 218 between the PD Interface Controller and the PHY may take the form of transformers, capacitors, opto-couplers or any method that allows the common mode of the transceiver IC to be independent of the PHY's common mode up to some specified limit—such as the 1500V required for Ethernet.

This improved architecture described herein may be used for non-powered network devices as well (i.e., not powered using the power carried by the mixing segment 108). Moving the data transceivers 216 to the mixing segment side of the isolation barrier 218 is beneficial for the reasons listed above, even when the node is not receiving power from the mixing segment. In this case, the data transceivers would receive isolated power from the PHY's power supply.

Figure 3:
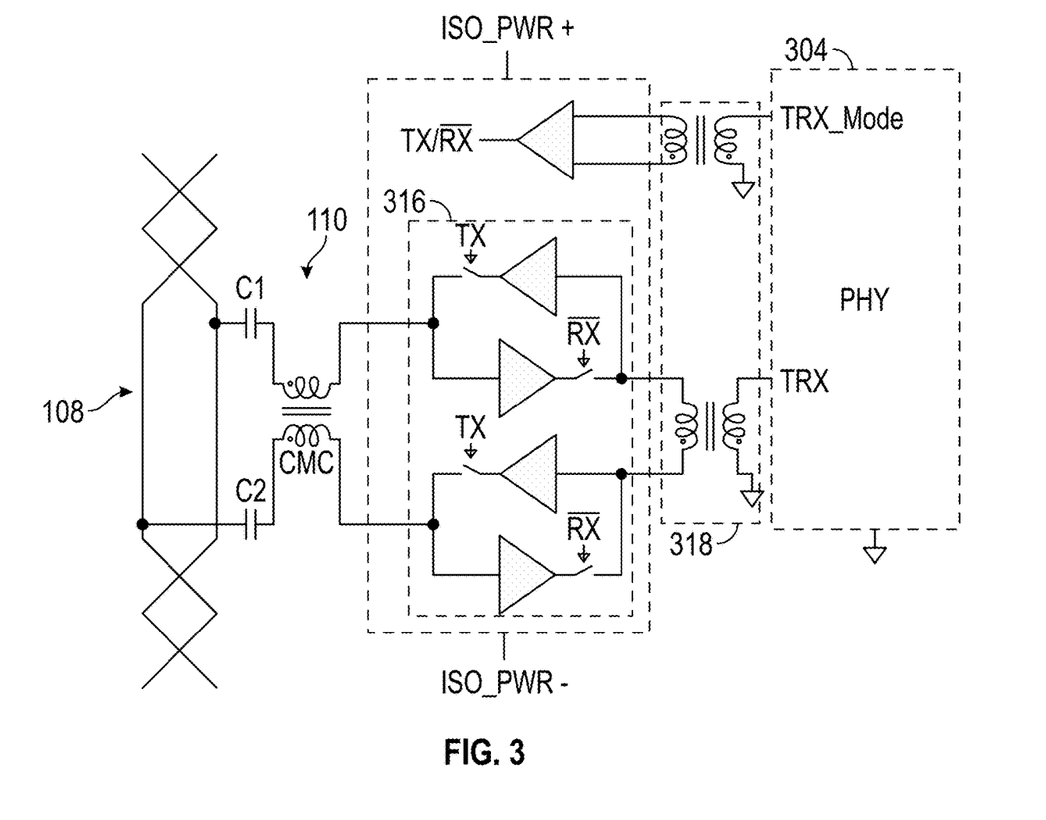
FIG. 3 is a circuit diagram of an example of a Non-Powered Device.

FIG. 3 is an example of a non-powered network device. The data transceivers 316 are powered using a power source isolated from the power source of the PHY 304, but the power source is not the mixing segment 108. The example in FIG. 3 includes a 2-pin PHY interface to the galvanic barrier 318. One pin for transmit and receive data (TRX) and a second pin for a TRX_Mode signal that is used by the PHY 304 to communicate with the data transceivers 316 to dictate whether the data transceiver is in transmit or receive mode. The data transceivers 316 can be included in an IC having a larger geometry, high-voltage process while the PHY 304 can be included in an IC having a smaller geometry, low-voltage process.

Figure 4:
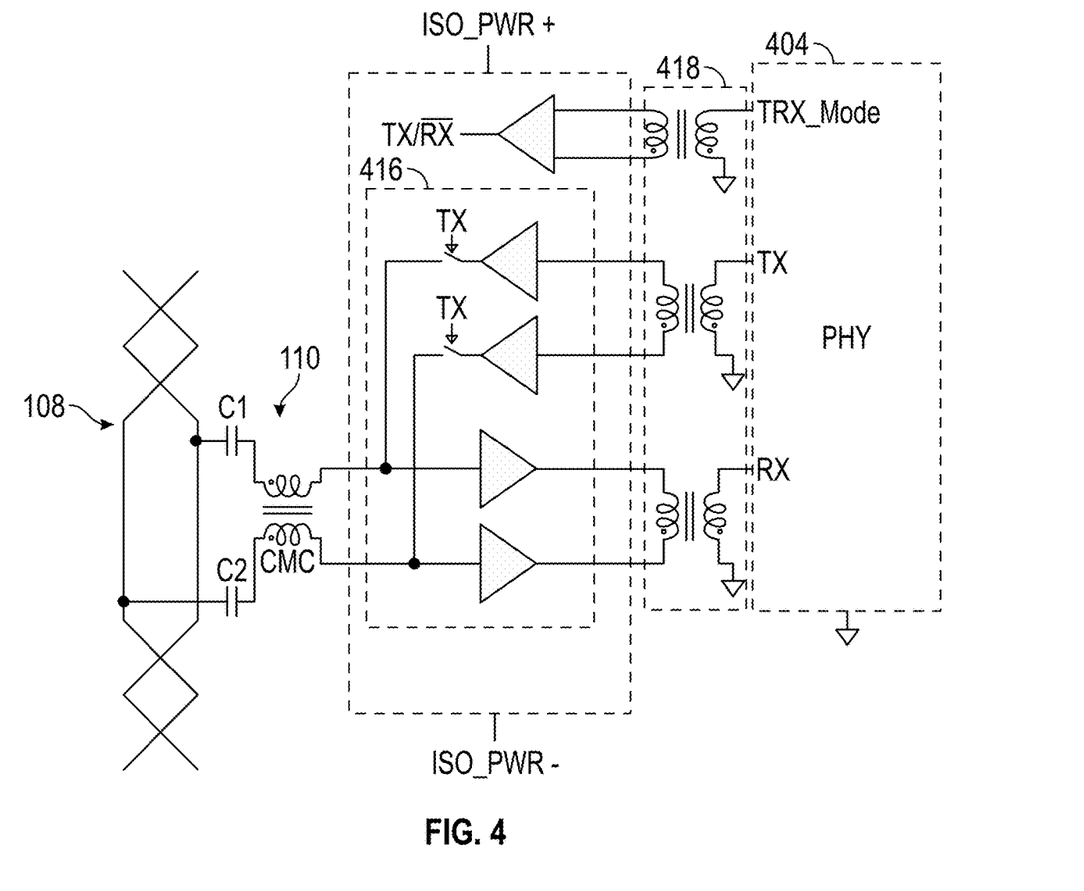
FIG. 4 is a circuit diagram of another example of a Non-Powered Device.

FIG. 4 is another example of non-powered network device. The data transceivers 416 are powered using a power source isolated from the power source of the PHY 404, but the isolated power source is not the mixing segment 108. The example in FIG. 4 includes a 3-pin PHY interface to the galvanic barrier 818. The interface includes receive data pin (RX), a transmit data pin (TX) and a TRX_Mode pin. The 3-pin PHY interface removes the receiver switch of the example in FIG. 3 at the expense of an additional isolation transformer.

Figure 5:
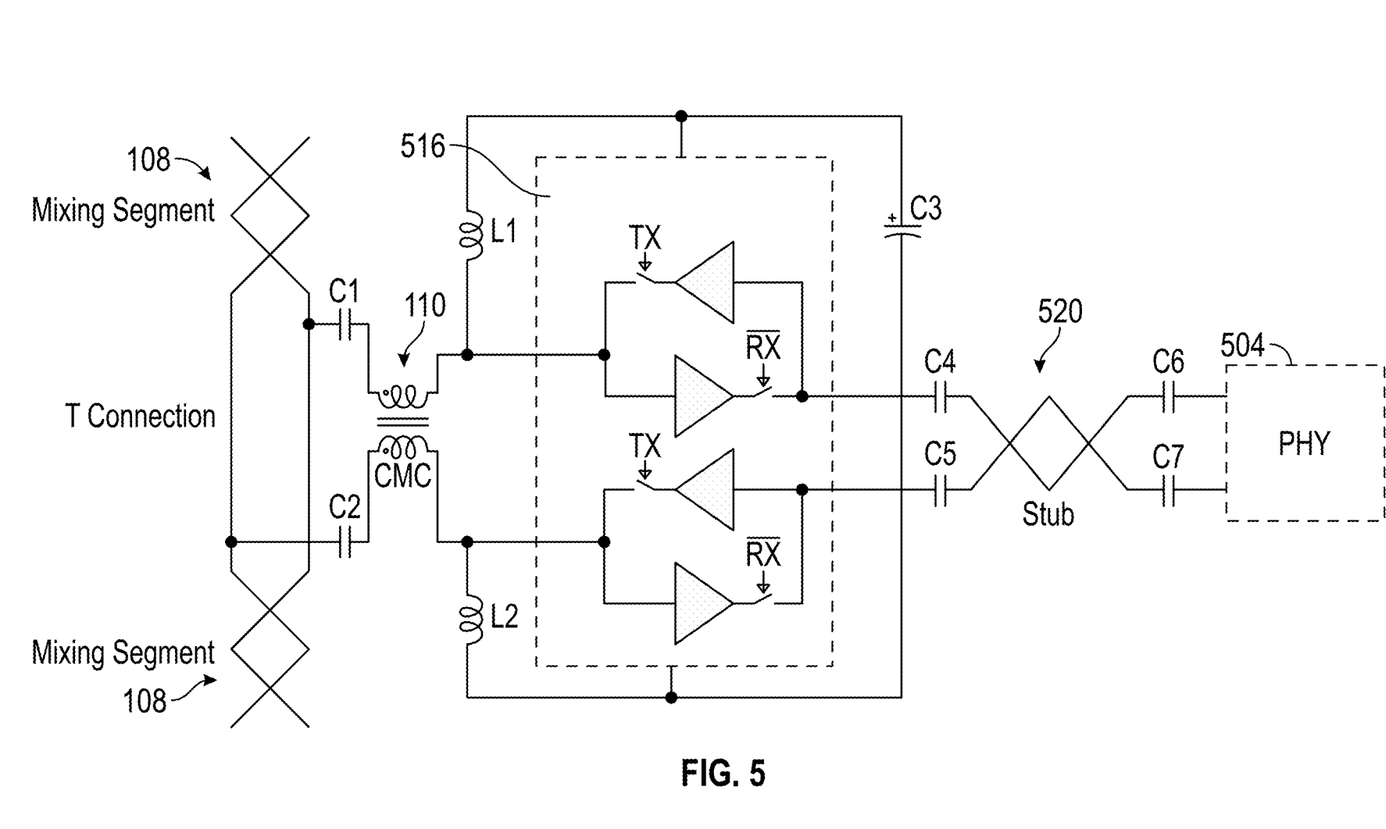
FIG. 5 is a diagram of another example of a Powered Device.

FIG. 5 shows the data transceivers being used as a PD to enable long "T" stubs to interface with the mixing segment. The data transceivers 516 are powered by the power on the mixing segment 108. The stub 520 includes a differential wired link (e.g., twisted wire pair) interface between the remote PHY 504 and the data transceiver 516. Normally the length of a T stub is constrained due to the propagation delay of the reflection causing distortion on the rest of the mixing segment. The data transceiver 516 solves this problem by allowing the remote PHY 504 to transmit and receive data without creating unwanted distortion on the mixing segment 108. In this configuration, the data transceiver automatically detects when the remote PHY 504 is transmitting and closes/opens its transmitter/receiver switches (TX, RX), respectively. In another approach, a second differential wired link (not shown) is used between the data transceivers 516 and the remote PHY 504 to create dedicated transmit and receive lanes or control when the data transceivers need to transmit or receive. One or more data transformers (not shown) may be used between the data transceivers 516 and the remote PHY 504 to isolate the remote PHY 504 from the data transceivers 516.

Figure 6:
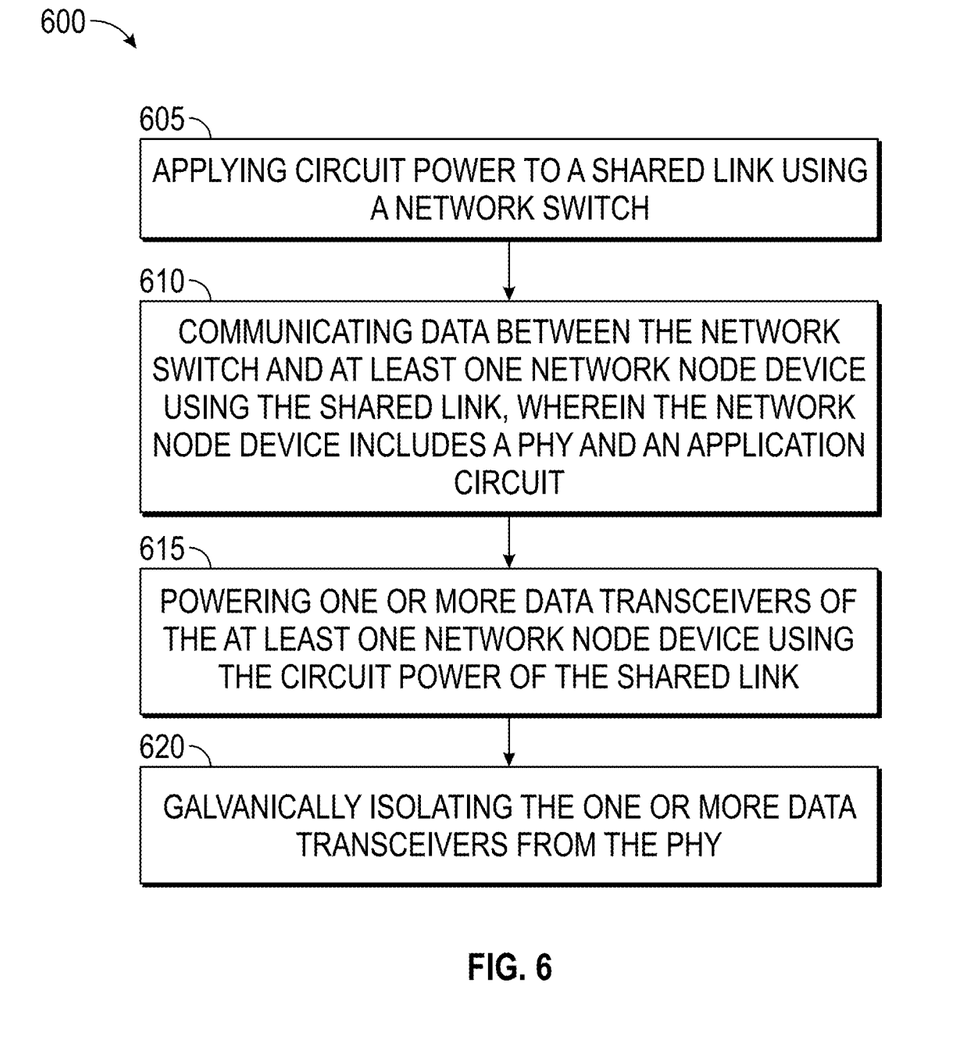
FIG. 6 is a flow diagram of an example of operating a data plus power system.

FIG. 6 is a flow diagram an example of a method 600 of operating a data plus power system. The system can be a multi-drop data and power system. At 605, circuit power is applied to a shared link using PSE. The shared link may be twisted wire pair and the PSE includes a network switch. The network switch can be an ethernet switch.

At block 610, data is communicated between the network switch and at least one network node device using the shared link. The network node device can be a PD. The network node device includes a PHY and an application circuit.

At block 615, one or more data transceivers of the network node device using is powered using the circuit power of the shared link. At block 620, the one or more data transceivers are galvanically isolated from the PHY. The data transceivers may be included in a PD interface controller that is powered by the shared link or the data transceivers may be directly powered by the shared link. The isolation between the PHY and the data transceiver can include one or more of transformers, capacitors, and optocouplers.

The method of FIG. 6 allows many PD devices to be placed techniques, devices, and system described allow for several devices to be coupled to the shared link of the data plus power system.

ADDITIONAL DESCRIPTION AND ASPECTS

A first Aspect (Aspect 1) includes subject matter (such as a network node device) comprising one or more data transceivers to transmit and receive data over the shared link; physical layer circuitry (PHY) to transmit and receive data with the one or more data transceivers; and a galvanic isolation barrier coupled between the PHY and the one or more data transceivers, wherein the PHY transmits and receives the data with the one or more data transceivers over the galvanic isolation barrier.

In Aspect 2, the subject matter of Aspect 1 optionally includes a powered device interface controller coupled to the shared link by a diplexer, wherein the one or more data transceivers are included in the powered interface controller and receive power via the shared link.

In Aspect 3, the subject matter of Aspect 2 optionally includes a power converter coupled to the shared link by the diplexer, coupled to the powered device interface controller, and galvanically isolated from the PHY. The power converter converts the power carried on the shared link to a power source for the PHY.

In Aspect 4, the subject matter of one or any combination of Aspects 1-3 optionally includes one or more data transceivers that are not powered using power carried on the shared link.

In Aspect 5, the subject matter of one or any combination of Aspect 4 optionally includes one or more data transceivers that receive power from a power source isolated from a power source of the PHY.

In Aspect 6, the subject matter of one or any combination of Aspects 1-5 optionally includes a galvanic isolation barrier that includes a two-pin PHY interface including a mode line and a data line.

In Aspect 7, the subject matter of one or any combination of Aspects 1-5 optionally includes a galvanic isolation barrier that includes a three-pin PHY interface including a mode line, a transmit data line, and a receive data line.

In Aspect 8, the subject matter of Aspect 1 optionally includes a differential wired link between the one or more transceivers and the PHY. The one or more data transceivers receive power via the shared link.

In Aspect 9, the subject matter of one or any combination of Aspects 1-8 optionally includes a common mode choke to couple the one or more data transceivers to the shared link.

In Aspect 10, the subject matter of one or any combination of Aspects 1-9 optionally includes the network node being an Ethernet node device of an Ethernet multi-drop network.

Aspect 11 includes subject matter (such as an electronic system) or can optionally be combined with one or any combination of Examples 1-10 to include such subject matter, comprising a shared link to carry power and data of a network, power sourcing equipment to provide power to the shared link and transmit and receive data via the shared link, multiple network node devices coupled to the shared link. At least one network node device includes a first integrated circuit including one or more data transceivers to transmit and receive data over the shared link, a second integrated circuit including circuitry to implement a physical layer (PHY) to transmit and receive data with the one or more data transceivers, and a galvanic isolation barrier coupled between the PHY and the one or more data transceivers. The PHY transmits and receives the data with the one or more data transceivers over the galvanic isolation barrier.

In Aspect 12, the subject matter of Aspect 11 optionally includes a first integrated circuit includes a powered device interface controller, and one or more data transceivers included in the powered interface controller that receive the power carried by the shared link.

In Aspect 13, the subject matter of Aspect 12 optionally includes a first integrated circuit including a power converter coupled to the power device interface controller. The power converter produces a circuit supply for the PHY using the power carried by the shared link and the power converter is galvanically isolated from the PHY.

In Aspect 14, the subject matter of claim 11 or claim 13, including one or more data transceivers that receive power from a power source isolated from a power source of the PHY. The one or more data transceivers are not powered using the power carried on the shared link.

In Aspect 15, the subject matter of Aspect 14 optionally includes a galvanic isolation barrier that includes a two-pin interface between the PHY and the one or more data transceivers, the two-pin interface including a mode line and a data line.

In Aspect 16, the subject matter of Aspect 14 optionally includes a galvanic isolation barrier that includes a three-pin interface between the PHY and the one or more data transceivers, the two-pin interface including a mode line, a transmit data line, and a receive data line.

In Aspect 17, the subject matter of one or any combination of Aspects 11-16 optionally includes a galvanic isolation barrier includes a differential receive data line and a differential transmit data line.

In Aspect 18, the subject matter of one or any combination of Aspects 11-17 optionally includes power sourcing equipment that is an ethernet switch and the network node is an ethernet node device.

Aspect 19 includes subject matter (such as a method of operating a data plus power system) or can optionally be combined with one or any combination of Examples 1-18 to include such subject matter, comprising applying circuit power to a shared link using a network switch; communicating data between the network switch and at least one network node device using the shared link, wherein the network node device includes a PHY and an application circuit; powering one or more data transceivers of the at least one network node device using the circuit power of the shared link; and galvanically isolating the one or more data transceivers from the PHY.

In Aspect 20, the subject matter of Aspect 19 optionally includes powering a power device interface controller using the circuit power of the shared link, and powering one or more data transceivers included in the power device interface controller using the circuit power of the shared link.

In Aspect 21, the subject matter of Aspect 20 optionally includes sending data to the PHY from the one or more data transceivers to the PHY using a differential wired link.

There non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A network node device for coupling to a network via a shared link that carries power and data, the network node device comprising:
   one or more data transceivers to transmit and receive data over the shared link;
   physical layer circuitry (PHY) to transmit and receive data with the one or more data transceivers; and
   a galvanic isolation barrier coupled between the PHY and the one or more data transceivers, wherein the PHY transmits and receives the data with the one or more data transceivers over the galvanic isolation barrier.

2. The network node device of claim 1, including:
a powered device interface controller coupled to the shared link by a diplexer, wherein the one or more data transceivers are included in the powered interface controller and receive power via the shared link.

3. The network node device of claim 2, including:
a power converter coupled to the shared link by the diplexer, coupled to the powered device interface controller, and galvanically isolated from the PHY; and
wherein the power converter converts the power carried on the shared link to a power source for the PHY.

4. The network node device of claim 1, wherein the one or more data transceivers are not powered using power carried on the shared link.

5. The network node device of claim 4, wherein the one or more data transceivers receive power from a power source isolated from a power source of the PHY.

6. The network node device of claim 4, wherein galvanic isolation barrier includes a two-pin PHY interface including a mode line and a data line.

7. The network node device of claim 4, wherein galvanic isolation barrier includes a three-pin PHY interface including a mode line, a transmit data line, and a receive data line.

8. The network node device of claim 1, including:
a differential wired link between the one or more transceivers and the PHY; and
wherein the one or more data transceivers receive power via the shared link.

9. The network node device of claim 1, including a common mode choke to couple the one or more data transceivers to the shared link.

10. The network node device of claim 1, wherein the network node is an Ethernet node device of an Ethernet multi-drop network.

11. An electronic system including:
a shared link to carry power and data of a network;
power sourcing equipment to provide power to the shared link and transmit and receive data via the shared link; and
multiple network node devices coupled to the shared link, wherein at least one network node device includes:
a first integrated circuit including one or more data transceivers to transmit and receive data over the shared link;
a second integrated circuit including circuitry to implement a physical layer (PHY) to transmit and receive data with the one or more data transceivers; and
a galvanic isolation barrier coupled between the PHY and the one or more data transceivers, wherein the PHY transmits and receives the data with the one or more data transceivers over the galvanic isolation barrier.

12. The electronic system of claim 11,
wherein the first integrated circuit includes a powered device interface controller; and
wherein the one or more data transceivers are included in the powered interface controller and receive the power carried by the shared link.

13. The electronic system of claim 12,
wherein the first integrated circuit includes a power converter coupled to the power device interface controller, and the power converter produces a circuit supply for the PHY using the power carried by the shared link; and
wherein the power converter is galvanically isolated from the PHY.

14. The electronic system of claim 11, wherein the one or more data transceivers receive power from a power source isolated from a power source of the PHY, and the one or more data transceivers are not powered using the power carried on the shared link.

15. The electronic system of claim 14, wherein the galvanic isolation barrier includes a two-pin interface between the PHY and the one or more data transceivers, the two-pin interface including a mode line and a data line.

16. The electronic system of claim 14, wherein the galvanic isolation barrier includes a three-pin interface between the PHY and the one or more data transceivers, the three-pin interface including a mode line, a transmit data line, and a receive data line.

17. The electronic system of claim 11, wherein the galvanic isolation barrier includes a differential receive data line and a differential transmit data line.

18. The electronic system of claim 11, wherein the power sourcing equipment is an ethernet switch and the network node is an ethernet node device.

19. A method of operating a data plus power system, the method including:
applying circuit power to a shared link using a network switch;
communicating data between the network switch and at least one network node device using the shared link, wherein the network node device includes a PHY and an application circuit;
powering one or more data transceivers of the at least one network node device using the circuit power of the shared link; and
galvanically isolating the one or more data transceivers from the PHY.

20. The method of claim 19, including:
powering a power device interface controller using the circuit power of the shared link; and
wherein powering the one or more data transceivers includes powering one or more data transceivers included in the power device interface controller using the circuit power of the shared link.

21. The method of claim 20, sending data to the PHY from the one or more data transceivers to the PHY using a differential wired link.

* * * * *